Figure 1:
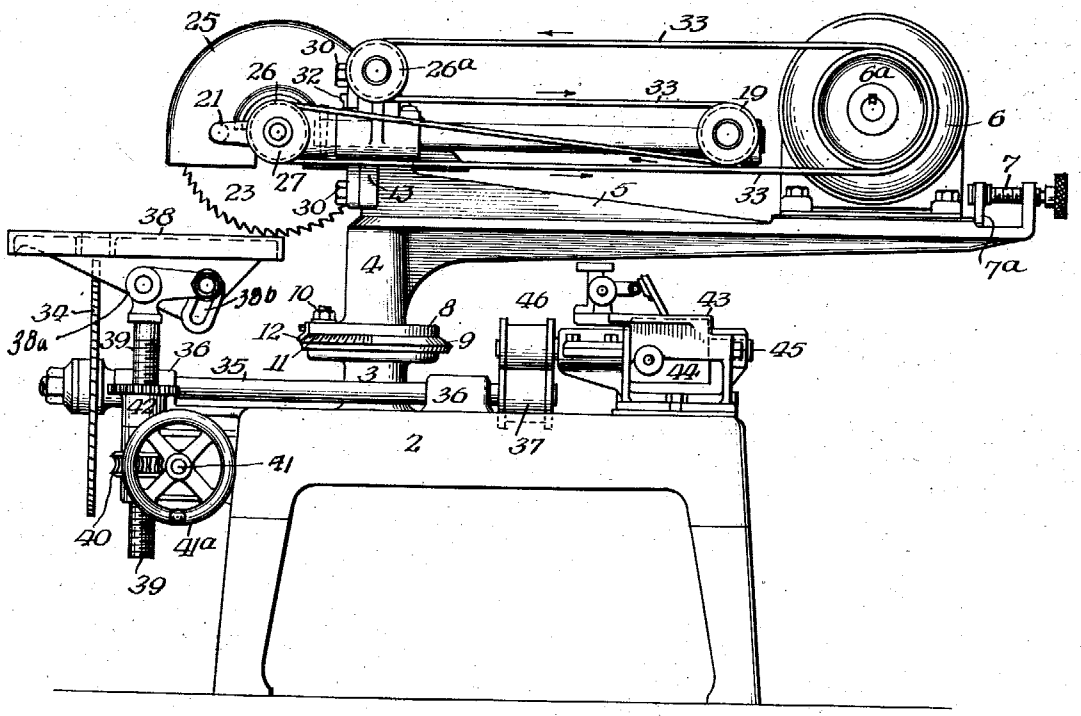

June 18, 1929. J. SCHMIDT Re. 17,329

WOODWORKING MACHINE

Original Filed June 2, 1923 3 Sheets-Sheet 1

Inventor:
John Schmidt
By Fred Gelach Atty.

June 18, 1929. J. SCHMIDT Re. 17,329

WOODWORKING MACHINE

Original Filed June 2, 1923 3 Sheets-Sheet 2

Inventor
John Schmidt
By Fred Gerlach Atty.

June 18, 1929. J. SCHMIDT Re. 17,329

WOODWORKING MACHINE

Original Filed June 2, 1923 3 Sheets-Sheet 3

Inventor:
John Schmidt
By Fred Gerlach Atty.

Reissued June 18, 1929. Re. 17,329

UNITED STATES PATENT OFFICE.

JOHN SCHMIDT, OF HOOPESTON, ILLINOIS.

WOODWORKING MACHINE.

Original No. 1,555,387, dated September 29, 1925, Serial No. 642,894, filed June 2, 1923. Application for reissue filed March 24, 1926. Serial No. 97,148.

The object of my invention is to provide a construction of woodworking machine adapted more particularly for various sawing operations, such as cross cutting, sawing in mitering, dadoing and kindred operations, and boring, and which may also, by adjustment, be adapted for rip sawing and jointing, these latter operations being capable of being carried on at the same time, the machine being of a universal character and self-contained so that it is of portable nature and usuable immediately at the place where the work is to be done.

Heretofore in machines of this character, it has been customary to mount the cross cut saw upon a sliding carriage together with the electric motor for operating it, the said motor directly belted to the mandrel or shaft of the saw so that all parts are moved together under manual manipulation in the act of sawing, whereby the connection between the source of power and the saw mechanism may be maintained during the operation. It has been found, however, that the great weight of the motor acting upon the overhanging end of the adjustable frame carrying the saw is highly objectionable, in that it makes the carriage difficult of manipulation owing to the greatly increased friction put upon its bearings or guides, with the result that it is laborious to operate and interferes with the attention on the part of the operator which he should give to the work being done by the saw. Further objection arises from the fact that excessive weight, put upon the adjustable frame when the motor is attached thereto, causes greater wear upon the guides and in that manner shortens the effective life of the machine.

Furthermore, in adjusting the connection of the motor from the cross cut saw to cause it to operate a rip saw or jointer or both, the position of the motor upon the carriage required adjustments to suit the new belting arrangements and necessitating the shifting of the motor from its original position and a readjustment when it is again required to be connected with the cross cut saw.

By my improvements, these objections to existing woodworking machines may be overcome, as the entire weight of the motor is removed from the carriage and the driving belt may be readily adjusted to the pulleys of the rip saw, shaft and jointer without any change in the adjustment of the motor.

More particularly, my improvements consist in providing a suitable frame preferably adjustable about a vertical axis and having a lateral arm to which the motor may be firmly connected, combined with a light adjustable carriage, slidably mounted on the frame to which the motor is secured, said carriage provided with a shaft or mandrel to which the cross-cut saw is secured, said shaft belted to the motor in an adjustable manner, whereby the belt connection between the motor pulley and the pulley on the saw shaft is maintained in operative relation for the various positions of adjustment of the carriage, the construction being such that the tension on the belt is maintained, notwithstanding the variable distances between the motor pulley and the saw shaft pulley by reason of the adjustment of the carriage and saw relatively to the motor. By this construction, the adjustable carriage upon which the saw shaft or mandrel is journalled for operating the saw, (and, if desired, a boring chuck), has no other duty to perform than the moving of an adjustable belt roller whose movement in respect to a fixed roller on the motor carrying frame enables the adjustment of the belt automatically for all movements of the carriage while, at the same time, keeping the belt under uniform tension.

As a further improvement, the driving mechanism comprising the belt and pulleys on the motor, the saw mandrel and the adjustable frame are employed in connection with driving pulleys for a rip saw and jointer by swinging the first mentioned parts around a vertical axis through an arc of 90° and then adjusting the adjustable carriage to put the belt under proper tension after the same has been removed from the saw mandrel pulley journalled on the adjustable carriage and placed in operative relation about the pulleys of the rip saw and jointer. In this latter case, the adjustability of the carriage provides a tension controlling means for the belt between the pulley of the motor and the pulleys of the rip saw and jointer, these being independent of the adjustable carriage, the devices permitting a quick adjustment of the belt between the motor and the pulleys of these parts.

Figure 2:
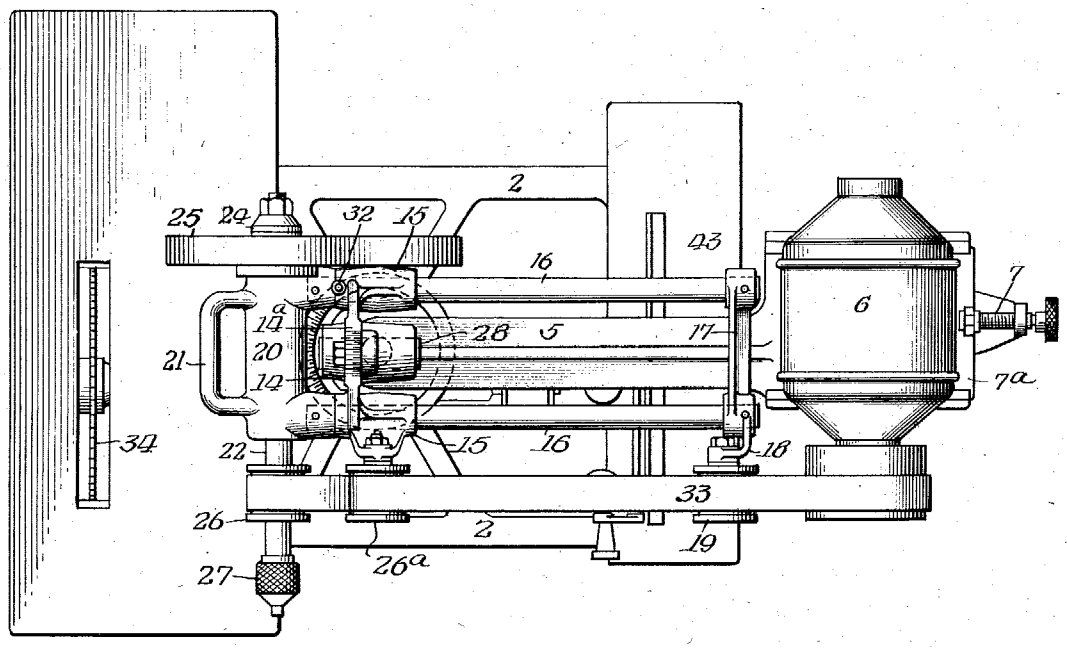
Figure 3:
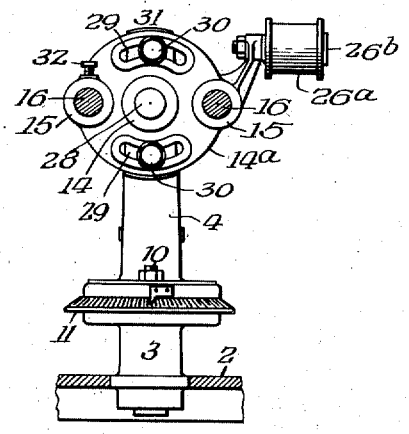
Figure 7:
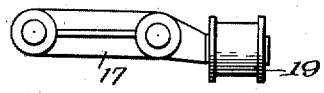
Figure 5:
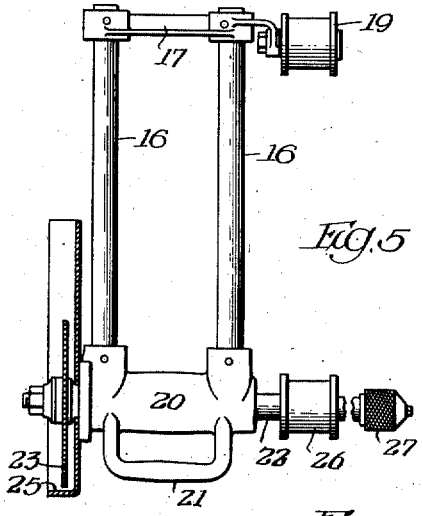
Figure 4:
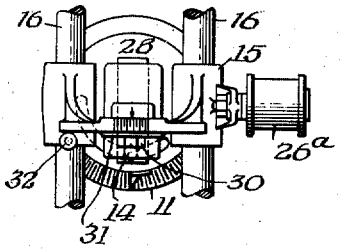
Figure 6:
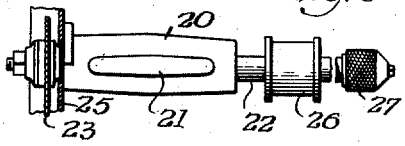
Figure 8:
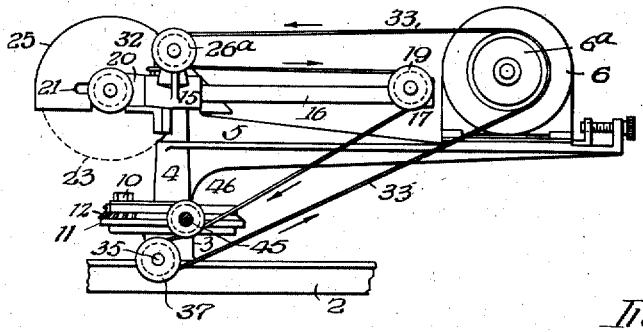

My invention also comprehends details of construction which, together with the features above referred to, will be better understood by reference to the drawings, in which:

Fig. 1 is a side elevation of a woodworking machine embodying my improvements; Fig. 2 is plan view of the same; Fig. 3 is an elevation of the means for supporting the motor carrying frame and also the adjustable carriage and showing part of the carriage in section; Fig. 4 is a plan view of the same; Fig. 5 is a plan view of the adjustable carriage and the parts carried thereby; Fig. 6 is a front view of Fig. 5 with a portion of the rip saw and guard broken away; Fig. 7 is an end view at the rear end of the carriage; and Fig. 8 is a side elevation illustrating the adjustment of the operative parts when the belt is arranged for driving the rip saw and jointer.

2 is the main frame of the machine and may be constructed in any suitable manner, whether it be an all-metal frame from the ground up or whether of a light material frame adapted to be supported upon a wooden base, both constructions being well known and in common use in machines of this class.

Extending upward from the main frame 2 is a pedestal 3 having a circular substantially horizontal flange 9. 4 is an upright frame having flange 8 at its bottom resting upon the flange 9 of the pedestal and adapted to rotate about a vertical axis thereon, and positioned, when adjusted by a suitable bolt and nut 10. A scale 11 is provided on the flange 9 of the pedestal and a pointer 12 secured to the flange 8 traverses the scale to indicate the extent of rotary adjustment. The upright frame 4 is provided with a lateral extending arm 5 to which the electric motor 6 is bolted or otherwise secured, with capacities for slight longitudinal adjustment by being bolted to an adjustable base 7ª which may be adjusted upon the arm 5 by means of the adjusting screw 7. The upright frame 4 terminates at the top in a head 13 carrying a short horizontal shaft 28 having its axis in longitudinal alinement with the arm 5, to which the motor is secured. 14ª is an adjustable head having a hub 14 which is journalled upon an extension of the short shaft 28 and this head is further provided with longitudinal guides 15 horizontally disposed on opposite sides of the hub 14. The head 14ª is further provided with segmental curved slots 29 whose curvature has the axis of the shaft 28 for a center, and clamping screws 30 extend through these slots and into the head 13 of the upright frame 4, said screws 30 being intended to clamp the head 14ª in different positions of adjustment about the axis of the shaft 28 for reasons which will be presently described.

The extent of the adjustment may be known by the presence of the scale 31 on the adjustable head 14ª, as more fully shown in Fig. 4. 16 are two longitudinal rods which extend through and are guided by the guides 15, these rods being connected at the rear end by a transverse frame 17 and are similarly secured together at the forward end, by means of a bearing frame 20 having an operative handle 21 and providing a transverse bearing for the mandrel or shaft 22 carrying the cross cut saw 23, the parts 16, 17 and 20 constituting an adjustable carriage which is free to slide longitudinally through the guides 15 for the purpose of causing the saw 23 to traverse the table 38 upon which the board or timber is placed. If desired, the saw mandrel or shaft 22 may be provided with a boring tool chuck 27 on its end opposite to that to which the saw is attached. This mandrel is also provided with a belt pulley 26. At the rear end of the adjustable carriage and in longitudinal alinement with the belt pulley 26 a second belt pulley 19, which is freely rotatable on a horizontal bearing 18 secured to the rear frame 17 of the carriage, is arranged. These pulleys 26 and 19 are, therefore, at a fixed distance apart.

26ª is an additional belt pulley, preferably of the same character as pulleys 19 and 26, and is journalled on a horizontal bearing 26ᵇ formed as an extension of the adjustable head 14ª (Figs. 3 and 4). The belt pulley 26ª is in the same longitudinal alinement with the pulleys 26 and 19 and all of these pulleys are in alinement with the driving belt pulley 6ª of the electric motor 6, as will be better understood by reference to Fig. 2. 33 is a driving belt whereby the saw mandrel 22 may be driven by the electric motor and, as shown, this endless belt extends around the motor pulley 6ª, thence around the pulley 26ª carried by the adjustable head 14ª, thence returning toward the motor it is passed about the pulley 19 at the rear end of the adjustable carriage, and thence returning in the first direction, it passes about the pulley 26 on the saw mandrel and then finally returns in the opposite direction to the motor pulley. By referring to Fig. 1, it will be seen that the alternate portions of the belt travel in opposite directions and that, while the pulleys 26 and 19 are at a fixed distance apart and therefore have no changeable action upon the length of the belt between the motor and the saw mandrel, the distance between the said pulley 19 and the pulley 26ª may be varied at will by the adjustment of the carriage carrying said pulleys 19 and 26; and by reason of the construction shown, any movement between the pulleys 19 and 26ª is compensated by a corresponding movement between the pulleys 26 and 26ª, but in an opposite direction. It will, therefore, be seen that if the length of the belt between the pulleys 26ª and 19 is reduced, owing to the forward movement of the carriage, the length of the belt between the pulleys 26 and the motor pulley 6ª is correspondingly lengthened, while the remaining portions of the belt, namely, that between the pulleys 19 and 26 and between 6ª and 26ª remain unchanged. It will also be seen that by the proper proportioning and positioning of the pulleys those portions of the belt which are adjustable as to their length are parallel, and consequently, no extent of adjustment of the carriage will vary the tension of the belt, the operative tension being predetermined by the adjustment of the screw 7. The oblique portion of the belt, namely, that portion which extends from the bottom of the pulley 19 to the top of the pulley 26, being between pulleys having fixed distances apart and never varying in its obliquity, has no effect upon the belt by reason of the obliquity. By reason of this construction, it will, therefore, be evident that the carriage may be freely adjusted without any great resistance on the part of the belt, but, nevertheless, there is always a direct pull from the underside of the pulley 26 to the pulley 6ª of the motor which, while giving a positive driving action independent of the other portions of the belt which pass around the pulleys 26ª and 19, this direct pull between the pulleys 26 and 26ª has an automatic action in returning the carriage to its rearmost position (Fig. 1), when released or left to itself. This automatic return of the carriage to its rearmost position is desirable as it always insures the saw being brought to such position that it is less dangerous to persons about the machine.

In certain classes of work, the saw 23 is required to be adjusted to an angle to the table 38 so that it may cut on an incline or bevel and provision is made for this purpose by the adjustability of the head 14ª in which the carriage is guided. By referring to Fig. 3, it will be understood that with the rods 16 of the carriage in a horizontal plane, the saw 23 will be revolving in a vertical plane. If, however, the head 14ª is adjusted about the shaft 28, the carriage will be similarly adjusted and the saw will revolve in a plane at an angle to the table, and this angularity may be varied according to the direction of the adjustment of the head 14ª and the carriage carried thereby. In this adjustment the pulleys 19, 26 and 26ª are all adjusted together and, therefore, do not change their relation with respect to their plane of rotation. However, as the upper pulley 26ª, being higher, has a slightly greater lateral adjustment than the pulley 26 on the mandrel, the displacement of the belt on the motor pulley 6ª is slightly greater and, therefore, the said pulleys 6ª is made sufficiently broad in its face to compensate for any such displacement of the belt positions. In this connection, I prefer that the pulleys 19, 26 and 26ª shall be flanged pulleys, whereas the pulley 6ª on the motor shaft may be cylindrical without crowning.

The table 38 may be supported and adjusted in any suitable manner. As shown, it is supported upon two vertical screw-threaded shafts 39 of which, being in alinement, one alone is shown. These shafts 39 are guided on the main frame and may be raised or lowered by nuts in the form of worm-wheels 40 which may be rotated by worms (not shown) on a transverse shaft 41 having a hand wheel 41ª. Lock nuts 42 may be employed to secure the table in adjusted position. Any other suitable means for adjusting the table vertically may be employed, if so desired. The table is pivoted on the upper ends of the shafts 39 on transverse journals 38ª and may have capacity for inclined adjustment thereon by means of the slot and bolt connections 38ᵇ, such adjustment, however, being in connection with the rip saw 34, and when the cross cut saw 34 is turned to a right angled position to that shown in Figs. 1 and 2.

The rip saw 34 is secured upon a horizontal shaft 35 journalled in bearings 36 on the main frame and the rear end of the shaft is provided with a driving pulley 37. The rip saw is arranged at one side of the pedestal 3 and at the opposite side is arranged a suitable jointer 43 having a cutter 44 carried on a horizontal shaft 45 whose inner end is provided with a driving pulley 46. The pulleys 37 and 46 are in the same vertical plane, and the distance of these pulleys from the vertical axis of the frame 4 is substantially the same as the lateral distances of the pulleys 19 and 26ª, to the axis of said frame 4 when the carriage is horizontal and the saw 23 vertical, so that when the frame 4 is rotated through an arc of 90°, the pulleys 19 and 26ª will all be in the same vertical plane with the pulleys 37 and 46. When the belt 33 is adjusted about the pulleys 26ª, 19, under pulley 46 and pulley 37, as shown in Fig. 8, the belt will run true in respect to these various pulleys. In making this adjustment, it will be understood that the loop of the belt 33 which formerly passed about the pulley 26 has been disconnected from said pulley and placed about the pulley 37 of the rip saw and caused to run with friction against the underside of the pulley 46 of the jointer, so that the rip saw and jointer may be operated at the same time.

In disconnecting the belt from the pulley 37, this may readily be done by moving the adjustable carriage carrying the pulley 19 forward, to loosen the belt and allow it to be slipped off the pulley 37 and from under the pulley 46, it may then be placed about the pulley 26 as before. The adjustable carriage carrying the pulleys 19 and 26 may be secured in position on the head 14ª when pushed backward into adjusted position, as in Fig. 8, by means of the clamping screw 32 which extends through one of the guides 15 and clamped upon the rod 16 of the carriage. Ordinarily, when the cross cut saw 23 is being used, the carriage is free to be reciprocated, but when it is out of action, as in the case of Fig. 8, then it must be clamped to prevent the pulley 19 from moving forward toward the pulley 26[a], as such an action would loosen the belt. Any other means of clamping the carriage in fixed position may be employed in place of the clamping screw 32.

It will be understood that when the motor carrying frame is swung around to the position shown in Fig. 8, to permit the belt to be coupled to the pulleys of the rip saw and jointer, the turn table structure 8, carrying said frame, must be clamped in its adjusted position by the clamping means 10. It will also be understood that in all other positions of adjustment of the said frame and turn table, such as where the cross cut saw 23 must take various predetermined angles with the table 38, it will be necessary to clamp said frame upon the pedestal for such predetermined positions of adjustment.

While I have shown the application of my invention to a woodworking machine, by way of example, it will be understood that the various details of the machine may be greatly modified without in any manner changing the fundamental features of the improvements. It will, therefore, be understood that my improvements may be employed with the saw 23 alone or in connection with the rip saw and jointer, or either of them, and the important feature of the improvement resides in the provision of a relatively fixed motor and an adjustable carriage carrying the saw and its mandrel and power transmitting connections between the motor pulley and the pulley on the saw mandrel which will maintain a constant power transmission effort while permitting the free reciprocation of the carriage and its saw.

It will now be apparent that I have devised a novel and useful construction which embodies the features of advantage enumerated as desirable, and while I have in the present instance shown and described the preferred embodiment thereof which has been found in practice to give satisfactory and reliable results, it is to be understood that I do not restrict myself to the details, as the same are susceptible of modification in various particulars without departing from the spirit or scope of the invention.

Having now described my invention, what I claim as new and desire to secure by Letters Patent, is:

1. In a woodworking machine, the combination of a table for the support of the material to be sawed, a horizontally rotatable frame pivoted to revolve about a vertical axis and provided with a rearwardly extending arm, a reciprocable carriage slidably mounted upon the rotatable frame, a saw and its mandrel mounted on the reciprocable carriage and adapted to be reciprocated over the table, a motor secured to the rearwardly extending arm so as to swing with the rotatable frame and having a driving pulley, a pulley on the saw mandrel in substantial horizontal alinement with the shaft of the motor, a pulley journalled at the rear end of the reciprocable carriage and in advance of the motor, a pulley journalled on the rotatable frame adjacent to its vertical axis and at an elevation higher than the pulley on the mandrel of the saw, and an endless belt extending about the pulley on the motor and providing two looped portions respectively arranged about the pulley on the saw mandrel and the pulley on the rotatable frame adjacent to the vertical axis thereof and the loop of said belt intermediate of the last two pulleys being looped backward about the pulley on the rear end of the reciprocable carriage, said belt providing parallel portions and one oblique portion, the latter extending between the pulley on the saw mandrel and the pulley at the rear end of the reciprocable carriage, and wherein further, said endless belt is arranged to be driven in a direction which causes a direct pull from the motor pulley upon the underside of the pulley on the saw mandrel, so as to automatically pull the reciprocable carriage into a rearward position when released as when putting the saw out of action relatively to the work.

2. The invention according to claim 1, wherein the rotatable frame is provided with guides for the reciprocable carriage whereby it is capable of being swiveled about a horizontal longitudinal axis for tilting the saw mandrel and saw at an angle to the plane of the table.

3. The invention according to claim 1, wherein further, the rotatable frame is provided with a carriage supporting head journalled thereon upon a horizontal axis, said head having bearings in which the reciprocable carriage is slidably mounted, and means for locking the head in different positions of adjustment upon the rotatable frame whereby the saw mandrel and saw may be adjusted to various angles relatively to the table.

4. The invention according to claim 1, wherein further, a rip-saw is provided in connection with the table for the materials to be sawed, said rip-saw having a shaft and pulley, and wherein the belt may be removed from the pulley of the saw mandrel of the reciprocable carriage and adjusted about the pulley of the rip-saw whereby the latter may be driven from the motor through the same power transmitting belt connections.

5. In a wood working machine, the combination of a support for the material to be sawed, a frame pivoted on a vertical axis and adjustable horizontally relatively to the support, a reciprocable carriage guided upon the adjustable frame and provided with a saw mandrel and saw whereby the latter is movable across the support for the materials, a motor carried upon the adjustable frame independently of the reciprocable carriage, compensating belt connections between the motor and the mandrel of the saw and wholly movable with the horizontally adjustable frame and carriage whereby the saw may be rotated while permitting reciprocations of the carriage, carriage guiding means pivoted to the adjustable frame upon a longitudinal horizontal axis parallel to the direction of reciprocation of the carriage whereby the carriage and saw may be given a rotary adjustment about said horizontal axis and relatively to the motor, and means for securing the carriage guiding means in its positions of adjustment.

6. In a woodworking machine, the combination of a supporting structure, a support for the work, a frame pivoted on the structure so that it may be adjusted horizontally into different positions and provided with a rearwardly extending arm rigid therewith, a manually shiftable carriage mounted on the end of the frame opposite said arm, so it may be reciprocated relatively to the frame, a mandrel for driving a tool mounted on the front end of and movable with the carriage, the carriage being reciprocable to permit the tool to be moved transversely to the work, and means for driving the mandrel comprising a pulley on the mandrel, an idler pulley at the rear end of the carriage and movable therewith, a pulley at the outer end of the arm, a pulley at said opposite end of the frame and substantially adjacent the vertical axis of the frame, a motor for driving one of the pulleys on the frame, and an endless belt having a reach extending between the pulleys on the frame, a reach extending between the pulley at the outer end of the arm and the mandrel pulley, and a loop between said reaches and extending around the idler pulley.

7. In a woodworking machine, the combination of a supporting structure, a support for the work, a frame mounted on the supporting structure to swing horizontally, said frame including a rearwardly projecting arm, a carriage slidably mounted on the frame opposite said arm, a mandrel for driving a tool mounted at one end of and movable with the carriage, the latter being slidable so as to permit the tool to be moved across the work, means for driving the mandrel comprising a pulley on the mandrel, an idler pulley at the other end of the carriage and movable therewith, a pulley at the outer end of the arm, a pulley on the frame, a motor for driving one of the frame-pulleys, and an endless belt having a reach extending between the pulleys on the frame, a reach extending between the pulley at the outer end of the arm and the pulley on the mandrel, and a loop between said reaches and extending around the idler pulley, and means whereby the mandrel may be adjusted about a substantially horizontal axis to position it angularly with respect to the work.

JOHN SCHMIDT.